United States Patent
Blanc

(10) Patent No.: US 10,362,799 B2
(45) Date of Patent: Jul. 30, 2019

(54) DEVICE FOR SEPARATING STALKS OF FRUITS GROUPED IN BUNCHES AND METHOD FOR SEPARATING STALKS OF FRUITS GROUPED IN BUNCHES

(71) Applicant: RODA IBÉRICA, S.L., Alzira (Valencia) (ES)

(72) Inventor: Christophe Blanc, Alzira (ES)

(73) Assignee: RODA IBERICA, S.L., Alzira (Valencia) (ES)

( * ) Notice: Subject to any disclaimer, the term of this patent is extended or adjusted under 35 U.S.C. 154(b) by 272 days.

(21) Appl. No.: 15/065,046

(22) Filed: Mar. 9, 2016

(65) Prior Publication Data
US 2016/0262441 A1 Sep. 15, 2016

(30) Foreign Application Priority Data
Mar. 10, 2015 (ES) .................................. 201530299

(51) Int. Cl.
*A23N 15/02* (2006.01)
*A23N 15/00* (2006.01)

(52) U.S. Cl.
CPC ........ *A23N 15/02* (2013.01); *A23N 2015/006* (2013.01)

(58) Field of Classification Search
CPC .......................... A23N 15/02; A23N 2015/006
USPC ......... 99/638, 641, 571, 629, 637, 643, 537, 99/538, 510, 501, 502, 503; 241/40; 426/479; 460/123, 125, 126; 15/3.13, 15/3.11; 100/98 R, 108, 213, 110, 126, 100/282
See application file for complete search history.

(56) References Cited

U.S. PATENT DOCUMENTS

| 1,908,220 | A | | 5/1933 | Chapman | |
|---|---|---|---|---|---|
| 3,354,923 | A | | 11/1967 | Voller | |
| 3,372,634 | A | * | 3/1968 | Games | A47J 31/043 426/112 |
| 3,447,337 | A | * | 6/1969 | Nelson | A23B 7/148 426/419 |
| 3,918,116 | A | | 11/1975 | Valespino | |

(Continued)

FOREIGN PATENT DOCUMENTS

EP 1232695 A2 * 8/2002 ............... A23N 4/08

OTHER PUBLICATIONS

Polyethylene properties.pdf.*

(Continued)

*Primary Examiner* — Dana Ross
*Assistant Examiner* — Ket D Dang
(74) *Attorney, Agent, or Firm* — Wenderoth, Lind & Ponack, L.L.P.

(57) ABSTRACT

A device comprises a fruit reception compartment, a fruit suction area, a liquid suction area comprising an orifice, and a narrowing which feeds into a channel, with a water flow between the narrowing and the channel, and the channel defining part of a pipe configured to carry impelled liquid inside the channel. A method comprises supplying a mixture of fruits in bunches and liquid, moving the mixture to a fruit suction area through a suction entrance, aspirating and injecting liquid through the channel, generating a depression which drags the mixture towards the narrowing, and generating turbulence which separates stalks from the fruit and extracts the separated fruit.

17 Claims, 3 Drawing Sheets

(56) References Cited

U.S. PATENT DOCUMENTS

| | | | | |
|---|---|---|---|---|
| 5,996,485 | A | * 12/1999 | Suter | ............... A23N 1/00 100/108 |
| 6,988,622 | B1 | * 1/2006 | Victor | ............... A23N 4/24 209/156 |
| 2007/0163451 | A1 | 7/2007 | Fachaux | |
| 2007/0259705 | A1 | * 11/2007 | Blanc | ............... A23N 15/02 460/125 |
| 2014/0224134 | A1 | * 8/2014 | Pathak | ............... A23N 4/12 99/493 |

OTHER PUBLICATIONS

European Search Report dated Jul. 20, 2016 in corresponding European patent application No. 16159363.7.
European Opinion dated Jul. 20, 2016 in corresponding European patent application No. 16159363.7.

* cited by examiner

DEVICE FOR SEPARATING STALKS OF FRUITS GROUPED IN BUNCHES AND METHOD FOR SEPARATING STALKS OF FRUITS GROUPED IN BUNCHES

BACKGROUND OF THE INVENTION

1. Field of the Invention

This invention refers to a device for separating stalks of fruits grouped in bunches, such as cherries. It also refers to a method for separating stalks of fruits grouped in bunches. The invention is applied in the food industry.

2. Description of Related Art

There is a need to separate fruits which are collected from a producing tree, joined to each other by stalks or stems, in other words fruits grouped in bunches, in such a way that, once the separation has been performed, each of the fruits keeps its respective individual stalk. This facilitates subsequent processing of the fruits given that, once they are separated, they can be classified appropriately, for example, by size, color, ripeness or quality, thus improving the commercial presentation and the price that can be obtained for the product. In addition, automatic separation reduces considerably the labor costs involved in manual separation.

Documents FR2820287 and ES2319713 describe devices for separating stalks of fruits grouped in bunches. These devices comprise a hydraulic circuit in which a mixture of liquid and fruits enters a centrifugal pump and is pumped, in such a way that said devices use an adapted pump (flow sufficiently open) to allow the fruits mixed with the liquid to pass through its internal elements. However, the passage of the fruits through a centrifugal pump can cause damage of varying degrees to the fruits processed by the device, because when the fruits enter the body of the centrifugal pump there is a risk of the fruits colliding with the moving parts of the pump and the walls, especially when the pump is required to work at high speed to ensure an appropriately efficient separation of stalks, when the flow of fruits is high, when the fruits in question are sensitive because of their variety or ripeness, or when the separation is more difficult because the stalks are difficult to separate, which also requires an increased pump speed to obtain an appropriate percentage of efficiency in the separation.

There is thus a need to develop a device designed to separate stalks of fruits grouped in bunches (i.e. by means of their respective stalks), to overcome at least some of the drawbacks indicated above.

SUMMARY OF THE INVENTION

The object of the invention is a device to separate stalks of fruits grouped in bunches, which comprises:
  a compartment for receiving fruits, in which fruits and a liquid are located, connected to an area for suction of fruits and connected to an area for suction of liquid,
  a narrowing which comprises an outlet from the narrowing which flows into a channel, with a flow of water between the outlet of the narrowing and the channel The liquid suction area comprises a first orifice for connection to means for suction of liquid.

In the device for separating stalks of fruits grouped in bunches which is the object of the invention the channel forms part of a pipe which comprises a tube or conduit to introduce liquid at high speed into the channel through the flow of water, in such a way that a depression is generated in the channel which generates a system of turbulence to separate the fruits from each other and drags a mixture of fruits and liquid from the fruit suction area to the pipe through the narrowing.

In the device for separating stalks of fruits grouped in bunches which is the object of the invention, the liquid suction area is connected to the fruit reception compartment via a filter.

The device for separating stalks of fruits grouped in bunches which is the object of the invention comprises a vertical housing upstream of the channel which connects with a fruit evacuation area arranged in perpendicular fashion to the vertical housing.

In one embodiment, the filter in the device for separating stalks of fruits grouped in bunches which is the object of the invention comprises a bottom and at least one mesh made wall.

In another embodiment, the filter in the device for separating stalks of fruits grouped in bunches which is the object of the invention comprises at least one non-filtering wall in contact with the fruit reception compartment, in which the wall comprises an upper end which is lower than the height of the fruit reception compartment, so that the liquid reaches the filter when it exceeds this upper end.

In the preferred embodiment of the device for separating stalks of fruits grouped in bunches which is the object of the invention, the inside of the narrowing area is covered with a material with a friction coefficient of less than 0.4.

The material covering the narrowing area is a material which may be either polytetrafluoroethylene (PTFE), high molecular weight polyethylene or polyphthalamide (PPA).

The device for separating stalks of fruits grouped in bunches which is the object of the invention comprises means for regulating the position of the pipe in the channel.

In the device for separating stalks of fruits grouped in bunches which is the object of the invention, the suction means connected to the first orifice comprise at least one impeller pump.

The fruit reception compartment in the preferred embodiment of the device for separating stalks of fruits grouped in bunches which is the object of the invention comprises at least one inclined plane directed towards the fruit suction area.

The device for separating stalks of fruits grouped in bunches which is the object of the invention comprises an additional filter between the liquid suction area and the first orifice. A further object of the invention is a method for separating stalks of fruits grouped in bunches, using the device defined previously. The abovementioned method comprises the following steps:
  supplying a mixture of fruits grouped in bunches and liquid in a fruit reception compartment,
  moving the mixture of fruits grouped in bunches and liquid to a fruit suction area through a suction entrance,
  aspirating part of the liquid and causing it to circulate at high speed through at least one pump,
  injecting the liquid at high speed through a pipe to a channel located after the fruit suction area, generating a depression in the channel which drags a mixture of liquid with fruits in the fruit suction area to a narrowing located between the channel and the fruit suction area, in such a way that turbulences are generated around the fruits, which separate the fruit stalks from each other,
  extracting the separated fruits.

In the method for separating stalks of fruits grouped in bunches which is the object of the invention, the step for extracting the separated fruits involves sending the fruits to an evacuation area arranged upstream of the narrowing area.

The method for separating stalks of fruits grouped in bunches comprises an additional step for filtering the aspirated liquid.

BRIEF DESCRIPTION OF THE DRAWINGS

Given below, for illustrative purposes and without limitation, are descriptions of particular embodiments of this invention, with reference to the attached drawings, in which.

The different numerical references featured in the figures correspond to the following elements:
1.—fruit reception compartment,
2.—filter,
3.—first orifice,
4.—second orifice,
5a.—vertical housing,
5b.—evacuation area,
6.—suction entrance,
7.—narrowing,
8.—pipe,
9.—entrance,
10.—fruit suction area,
11.—liquid suction area,
12—channel,
13.—additional filter,
14.—water flow,
21.—wall,
22.—upper end of the wall,
31.—pump,
101.—upper part of the fruit reception compartment, and
102.—lower part of the fruit reception compartment.

DETAILED DESCRIPTION OF EMBODIMENTS OF THE INVENTION

In the different figures, the same reference numbers have been used to indicate the same elements.

Figure 1:
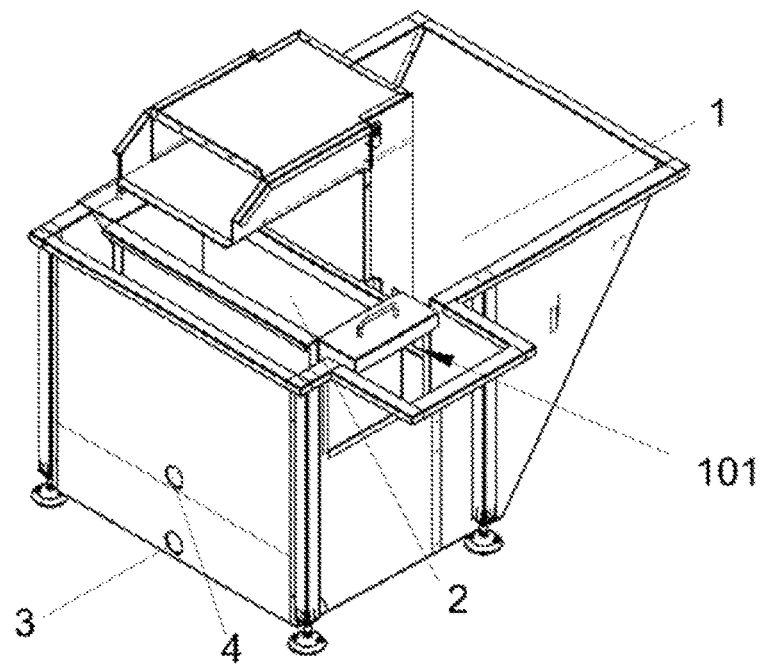
FIG. 1 shows a general perspective view from above of a device for separating stalks of fruits in accordance with one embodiment.

FIG. 1 shows a perspective view of a device for separating stalks of fruits grouped in bunches in accordance with an embodiment of the invention. According to FIG. 1, the device comprises a fruit reception compartment (1). In an embodiment, as the fruits arrive from the collection point, they can be transferred directly into the fruit reception compartment (1). In other embodiments, the fruits can be transferred onto a conveyor belt (not represented in any figure) which transports the fruits to the fruit reception compartment (1). When the fruits come directly from the collection point, they are grouped in bunches joined by their stalks.

When the device object of the invention begins to operate, it is essential that the fruit reception compartment (1) contains a liquid (preferably water) together with the fruits.

As the operation of the device requires a mixture of liquid and fruits, this mixture may be generated as follows:

the fruit reception compartment already (1) contains the liquid, the liquid is added to the fruit reception compartment (1) after the reception of the fruits, or fruits and liquid are supplied simultaneously.

In the embodiment shown in FIG. 1 the fruit reception compartment (1) comprises an inclined plane which guarantees that the fruits fall by force of gravity into a lower part (102) of the fruit reception compartment (1).

Figure 2:
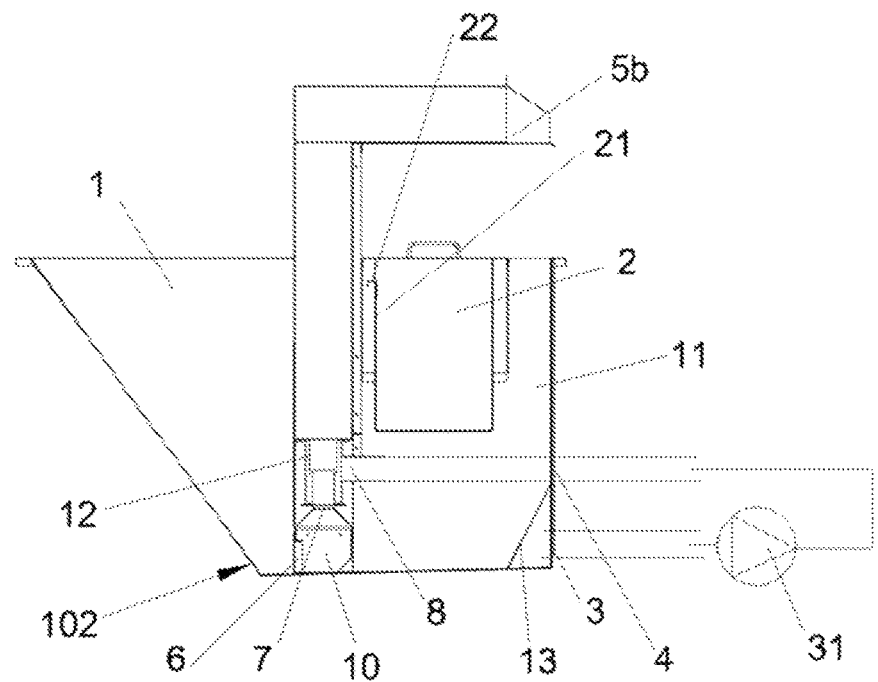
FIG. 2 shows a cross-section of the device shown in FIG. 1.

FIG. 2 shows that the device comprises an area for suction of fruits (10) connected to the lower part (102) of the fruit reception compartment (1) via a suction entrance (6). After the fruit suction area (10), according to the route followed by the fruits in the device which is the object of the invention, the device comprises a channel (12) through which the fruits circulate. The channel (12) in the preferred embodiment of the invention is in the vertical position.

In the preferred embodiment of the invention (the one shown in FIG. 1), the upper part (101) of the fruit reception compartment (1) is connected to a liquid suction area (11). The liquid suction area (11) is connected to the fruit reception compartment (1) via a filter (2), which prevents any impurity from the fruits entering with the liquid. The filter (2) can be a mesh filter which allows liquid to pass while retaining the fruits, and may also comprise a non-filtering wall (21) in contact with the fruit reception compartment (1). In these cases, the non-filtering wall (21) has an upper end (22) located in a position lower than the height of the fruit reception compartment (1) (see FIG. 2) so that, when the device is in use, and when the fruit reception compartment (1) is being filled with liquid and fruits, and said liquid exceeds this upper end (22), the liquid passes into the liquid suction area (11). The filter (2) ensures that the liquid aspirated by the pump (31) is residue-free, given that the fruit entering the fruit reception compartment (1) comes directly from collection and is accompanied by a multitude of residues.

The filter (2) in the preferred embodiment of the device object of the invention is in the form of a drawer, allowing the filter to be extracted and the residue which has accumulated in the drawer to be removed.

In addition, the liquid suction area (11) is connected to a pump (31) via a first orifice (3) made in a side wall. In some embodiments, the device also comprises an additional filter (13) located between the liquid suction area (11) and the first orifice (3).

The device object of the invention comprises a narrowing (7) after the fruit suction area (10) with an outlet from the narrowing (7) which flows into a channel (12), with a flow of water (14) between the walls of the narrowing (7) outlet and the walls of the channel (12).

The channel forms part of a pipe (8) which comprises a tube or conduit which carries the liquid pumped at high speed from the pump (31) to the pipe (8) through a second orifice, so that the fruit-free liquid, having been aspirated and accelerated, is re-injected into the channel (12) passing through the flow of water (14) between the walls of the narrowing (7) outlet and the walls of the channel (12), producing a depression which drags the liquid and fruit mixture in the fruit suction area (10). As a result of the effect of the depression, turbulence is generated in the channel (12) which causes the dragged fruits, joined by their stalks, to separate from each other.

According to the embodiment in FIG. 2, the device comprises, after the channel (12), a vertical housing (5a) (which can be seen in FIG. 3), which ends in a fruit evacuation area (5b) which, as can be seen in the embodiment in FIG. 2, is arranged perpendicular to the vertical housing (5a).

Figure 3A:
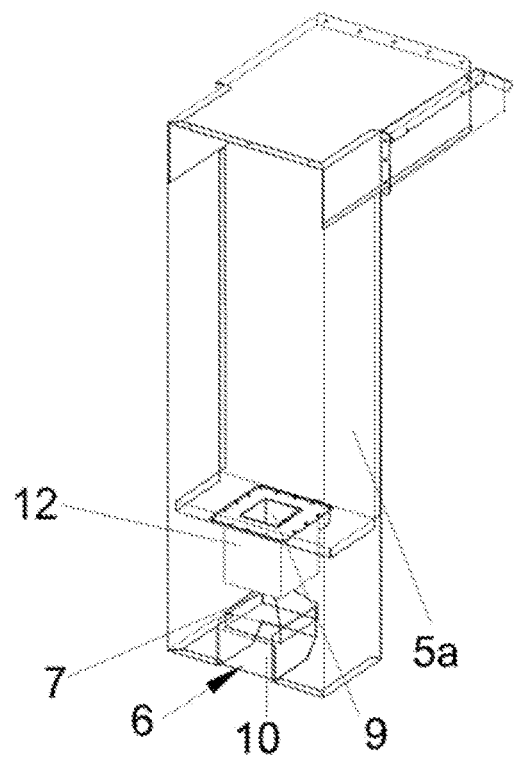
FIGS. 3a and 3b show schematic perspectives, from opposite side positions, of an embodiment of vertical housing incorporated in the device in FIG. 1.
Figure 3B:
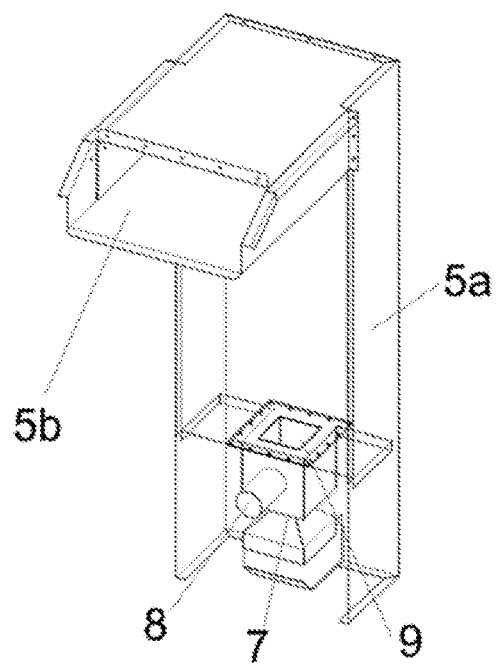

FIGS. 3a and 3b show opposed schematic perspective views of an embodiment of a vertical housing (5a) incorporated in the device in FIG. 1. To allow a better view of the elements of the vertical housing (5a), said vertical housing (5a) has been represented as though it were transparent. This embodiment shows that both the fruit suction area (10) and the narrowing (7) and the channel (12) are located in the vertical housing (5a). FIGS. 3a and 3b also show a suction entrance (9) from the channel (12) to the vertical housing (5a), through which the mixture of liquid and fruits is dragged to the evacuation area (5b).

In the embodiment in FIG. 3a the suction entrance (9) is housed in a lower area of the vertical housing (5a), and FIG. 3b clearly shows that the pipe (8) for the means of injecting the high speed liquid is located before the suction entrance (9), bearing in mind the flow direction of the fruits in the device which object of the invention.

The area in which the narrowing (7) occurs is covered with a low friction coefficient material which facilitates the flow of the fruit and liquid mixture through it. In the different embodiments, the low friction coefficient material used to cover this narrowing (7) is a material which can either be polytetrafluoroethylene (PTFE), high molecular weight polyethylene or polyphthalamide (PPA).

Figure 4A:
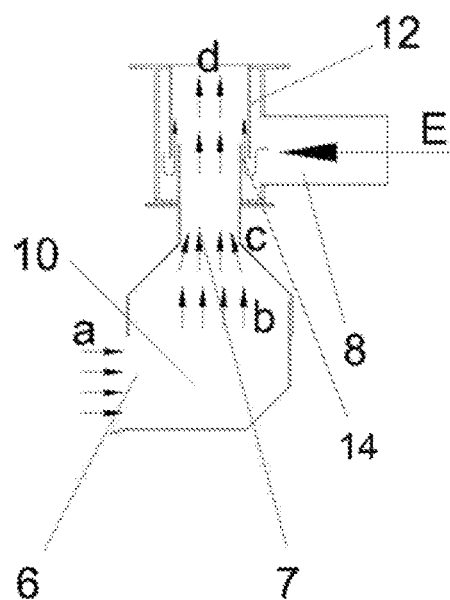
FIGS. 4a and 4b show details of the device in FIGS. 1 to 3b in partial schematic sections.

FIG. 4a shows a cross-section of the suction entrance (6) which gives access to the fruit suction area (10). In said FIG. 4a, the arrows marked with "a" represent the mixture of fruits and liquid entering the fruit suction area (10). Above (upstream of) the fruit suction area (10) is where the narrowing (7) is located. The arrows marked with "b" and "c" represent the mixture of fruits and liquid dragged upstream through the narrowing (7) by the effect of the depression caused by high speed liquid entering through the pipe (8). The arrows marked with "d" also represent the mixture of fruits and liquid dragged by the depression. In addition, the arrow marked "E" represents the injection of liquid at high speed through the pipe (8). The injection of liquid at high speed contributes both to producing the turbulence necessary for the stalks connected to each other to separate, and to drag the mixture of fruits and liquid from the fruit suction area (10) to the evacuation area (5b).

Figure 4B:
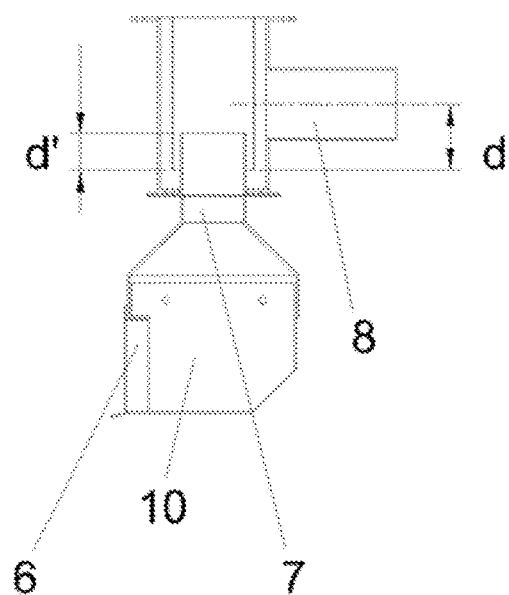

FIG. 4b shows two possible positions (d and d') of the pipe (8) with regard to the fruit suction area (10) inside the channel (12). These two positions can be obtained using means to regulate the position of the pipe (8).

These means for regulating the position of the pipe (8) are mounting holes and grooves, where the pipe (8) is moved in its entrance to the channel (12).

In all the embodiments, the fruit suction area (10), the pipe (8) and the channel (12) can have any cross-section, for example circular, square, rectangular or any other shape, and these elements can have a different cross-section from that of the element located before or after (following the route of the fruits in the device object of the invention), provided the changes in cross-section between adjacent elements do not alter the flow from the suction entrance (6) to the evacuation area (5b).

In all the embodiments of the invention, other types of pumps for liquid apart from centrifugal pumps can be used, provided the pressure jet can be directed inside the pipe (8) to impel the mixture of fruits and liquid in a direction towards the evacuation area (5b).

A further object of the invention is a method for separating stalks of fruits grouped in bunches, using the device defined previously.

The method for separating stalks of fruits grouped in bunches comprises the following steps:
supplying a mixture of fruits grouped in bunches and liquid in a fruit reception compartment (1),
aspirating part of the liquid and causing it to circulate at high speed through at least one pump,
filtering the aspirated liquid,
moving the mixture of fruits grouped in bunches and liquid to a fruit suction area (10) through a suction entrance (6),
injecting the liquid at high speed through a pipe (8) to a channel (12) located after the fruit suction area (10), generating a depression in the channel (12) which drags a mixture of liquid with fruits in the fruit suction area (10) to a narrowing (7) located between the channel (12) and the fruit suction area (10), in such a way that turbulences are generated around the fruits, which separate the fruit stalks from each other,
circulating the fruits towards an evacuation area (5b) arranged upstream of the narrowing (7).

Although only some particular embodiments of the invention have been described here, an expert in the matter will understand that other alternative embodiments and/or uses of the invention are possible, as are obvious modifications and equivalent elements. Furthermore, this invention covers all the possible combinations of the specific embodiments which have been described. The numerical signs in brackets relating to the drawings in a claim are merely an attempt to improve understanding of the claim, and must not be interpreted as factors limiting the scope of protection of the claim. The scope of this invention must not be limited to specific embodiments, but must be determined solely from an appropriate reading of the attached claims.

The invention claimed is:

1. A device for separating stalks of fruits grouped in bunches, the device comprising:
a fruit reception compartment, where the fruits and a liquid are configured to be located, the fruit reception compartment being connected to a fruit suction area and a liquid suction area, the liquid suction area comprising an orifice connected to a pump for suction of at least a part of the liquid,
a narrowing comprising an outlet which feeds into a channel, and
a pipe configured to carry the at least the part of the liquid from the pump into the channel,
wherein the device is configured to:
produce a depression for dragging the fruits and the liquid located in the fruit suction area through the narrowing to the channel
such that the fruits and the liquid mix with the at least the part of the liquid flowing at a first speed from the pump, and a mixture of the at least the part of the liquid flowing at the first speed from the pump and the liquid flowing at a second speed from the fruit suction area generates turbulence that produces separation of the stalks from the fruits, and
wherein the first speed is higher than the second speed.

2. The device according to claim 1, wherein the liquid suction area is connected to the fruit reception compartment via a filter.

3. The device according to claim 2, wherein the filter is a first filter and the device further comprises a second filter located between the liquid suction area and the orifice.

4. The device according to claim 2, wherein the filter comprises a bottom and at least one mesh wall.

5. The device according to claim 4, wherein the filter comprises at least one non-filtering wall in contact with the fruit reception compartment, in which the at least one non-filtering wall comprises an upper end which is lower than a height of the fruit reception compartment, so that when the liquid exceeds the upper end, the liquid reaches the filter.

6. The device according to claim 1, further comprising a vertical housing upstream of the channel which connects with a fruit evacuation area which is perpendicular to the vertical housing.

7. The device according to claim 1, wherein the narrowing has an internal covering of a material with a friction coefficient of less than 0.4.

8. The device according to claim 7, wherein the material is at least one of: polytetrafluoroethylene (PTFE), polyethylene (PE) and polyphthalamide (PPA).

9. The device according to claim 8, wherein the polyethylene is high molecular weight polyethylene.

10. The device according to claim 1, further comprising means for regulating a position of the pipe in the channel.

11. The device according to claim 10, wherein the means for regulating the position of the pipe are mounting holes and grooves.

12. The device according to claim 1, wherein the fruit reception compartment comprises at least one inclined plane directed towards the fruit suction area.

13. The device according to claim 1, further comprising a filter located between the liquid suction area and the orifice.

14. The device according to claim 1, wherein the device is configured to circulate the fruits and the liquid upwardly against gravity through the narrowing to the channel.

15. A method for separating stalks of fruits grouped in bunches, using the device according to claim 1, the method comprising:
supplying a mixture of the fruits and a liquid in a fruit reception compartment,
moving the mixture of the fruits and the liquid to a fruit suction area through a suction entrance,
aspirating a part of the liquid and causing the part of the liquid to circulate through at least one pump,
injecting the part of the liquid through a pipe to a channel located after the fruit suction area, generating a depression in the channel which drags the mixture of the fruits and the liquid in the fruit suction area to a narrowing located between the channel and the fruit suction area, in such a way that turbulence is generated around the fruits, which separates the stalks of the fruits from each other, and
extracting the fruits which have been separated.

16. The method according to claim 15, wherein the extracting the fruits which have been separated comprises sending the fruits which have been separated to an evacuation area upstream of the narrowing.

17. The method according to claim 15, further comprising filtering the part of the liquid which has been aspirated.

* * * * *